US008489652B2

(12) United States Patent
Van De Vanter et al.

(10) Patent No.: US 8,489,652 B2
(45) Date of Patent: Jul. 16, 2013

(54) TRACKING OBJECT FIELDS USING RELOCATABLE OBJECT WATCHPOINTS

(75) Inventors: Michael Lee Van De Vanter, Mountain View, CA (US); Hannes E. Payer, Salzburg (AT); Douglas Norman Simon, Sunnyvale, CA (US); Benjamin Lawrence Titzer, Mountain View, CA (US); Mario I. Wolczko, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 365 days.

(21) Appl. No.: 12/792,685

(22) Filed: Jun. 2, 2010

(65) Prior Publication Data
US 2011/0302183 A1    Dec. 8, 2011

(51) Int. Cl.
G06F 12/00    (2006.01)
G06F 17/30    (2006.01)

(52) U.S. Cl.
USPC .......................................... 707/814; 707/820

(58) Field of Classification Search
None
See application file for complete search history.

(56) References Cited

U.S. PATENT DOCUMENTS

| 6,658,652 B1* | 12/2003 | Alexander et al. ............ 717/128 |
| 2003/0221022 A1* | 11/2003 | Sexton et al. ................. 709/321 |
| 2006/0173897 A1* | 8/2006 | Lee et al. ....................... 707/102 |
| 2008/0126866 A1* | 5/2008 | Hopkinson ..................... 714/35 |

* cited by examiner

Primary Examiner — Usmaan Saeed
Assistant Examiner — Yu Zhao
(74) Attorney, Agent, or Firm — Osha Liang LLP

(57) ABSTRACT

A method for managing an object watchpoint during a garbage collection cycle, including identifying an object having a field, where the object is associated with an original object location, where the field is associated with an original field location, and where the object and the field are located in a memory heap of a virtual machine memory, setting, within a debugger, the object watchpoint on the original field location, where the object watchpoint is a memory trap associated with the object, determining, after a relocation of the object by a garbage collector (GC), a new object location associated with the object, determining a new field location of the field based on the new object location, and setting, within the debugger, the object watchpoint on the new field location.

8 Claims, 14 Drawing Sheets

| Method | Relocation Table | Eager | Eager (optimized) | Selective |
|---|---|---|---|---|
| VM support | a. GC clears contents from the VM's *relocation table* at start of each GC cycle.<br>b. GC adds old/new addresses for each relocated object to the VM's *relocation table*.<br>c. At end of GC cycle, either increments a GC counter in VM memory or calls a distinguished "end of GC" method. | a. GC, immediately, after each object relocation, records the old/new addresses in a distinguished memory location.<br>b. At the conclusion of each object relocation, calls a distinguished "end of object relocation" method. | a. GC, immediately, after each object relocation, records the old/new addresses in a distinguished memory location.<br>b. At the conclusion of each object relocation, "touches" (reads or writes) the entry in the VM's *relocation card table* that corresponds to the memory region containing the object's old address. | None, but see need for agreement between VM and debugger about *how* forwarding pointers are used by the GC. |
| VM Halts, rank (1 = most) | 4:<br>After completion of each GC cycle, but *only* if any objects are being watched. | 1:<br>After every object relocation. | 2:<br>After some object relocations. | 3:<br>After relocation of watched objects only. |
| Trigger mechanism | Either a hidden memory watchpoint (e.g. on a GC counter) or a breakpoint (e.g. on a distinguished "end of GC" method). | Either a hidden memory watchpoint (e.g. on the location of the old/new addresses *or* a breakpoint (e.g. on a distinguished "end of object relocation" method). | A hidden memory watchpoint on each entry in the VM's *relocation card table* whose corresponding memory region includes one more more watched objects. | A hidden memory watchpoint on the watched object's field where it is known that the GC will store its *forwarding pointer* at the conclusion of the object's relocation. |

FIG. 11A

| Method | Relocation Table | Eager | Eager (optimized) | Selective |
|---|---|---|---|---|
| Debugger support | a. Creates a hidden memory watchpoint on the current location of the watched object's field.<br>b. When VM halt is triggered at the end of a GC cycle, reads contents of the *relocation table* from the VM.<br>c. Updates the hidden memory watchpoint for every relocated object being watched. | a. Creates a hidden memory watchpoint on the current location of the watched object's field.<br>b. When VM halt is triggered at the conclusion of an object relocation, reads the old/new addresses from the VM.<br>c. If the object that was just relocated is being watched, then updates the object's memory watchpoint. | a. Creates a hidden memory watchpoint on the current location of the watched object's field.<br>b. Creates and maintains a hidden memory watchpoint on each of the VM's *relocation card table*'s entries that corresponds to a region of VM memory in which one or more objects are being watched.<br>c. When VM halt is triggered on one of the *relocation card table* entries during GC, reads the old/new addresses from the VM.<br>d. If the object that was just relocated is being watched, then updates the object's memory watchpoint, *and* revises hidden memory watchpoints on the VM's *relocation card table*. | a. Creates a hidden memory watchpoint on the current location of the watched object's field.<br>b. Creates a hidden memory watchpoint on the distinguished watched object's field where it is known that the GC will store its *forwarding pointer* when the object is relocated.<br>c. When VM halt is triggered on the *forwarding pointer* during GC, reads the contents of the forwarding pointer in order to determine the object's new location.<br>d. Updates both hidden memory watchpoints: one on the watched field and one on the field where the forwarding pointer will be stored the next time that the object gets relocated. |
| Memory watchpoints required, rank (1=most) | 3:<br>One for each watched object field, optionally plus one for the VM halt trigger. | 3:<br>One for each watched object field, optionally plus one for the VM halt trigger. | 2:<br>One for each watched object field plus one for each memory region (as divided up by the *relocation card table*) that contains a watched object. | 1:<br>Two for each watched object (in the simple case where there is only one watched field per object): one for the watched field and one for the GC forwarding pointer location. |

FIG. 11B

| Method | Relocation Table | Eager | Eager (optimized) | Selective |
|---|---|---|---|---|
| Implementation Complexity, rank (1 = most) | 3:<br>a. VM must allocate, configure, and maintain the *relocation table*, large enough to record old/new address for every object allocation that might take place during a single GC cycle.<br>b. VM and debugger must agree on the size, location, and structure of the *relocation table*. | 4:<br>a. Debugger needs only to be able to read the old/new addresses from VM. | 1:<br>a. VM must allocate, configure, and maintain the *relocation card table* and its mapping to VM memory regions.<br>b. VM and debugger must agree on the size, location, and mapping to memory of the *relocation card table*.<br>c. Debugger must maintain non-trivial invariants between watched objects and card table entries, since more than one object may reside in the memory corresponding to a single card table entry, and there may be more then one watched field per object. | 2:<br>a. VM and debugger must agree on how, where in the object, and when in the object relocation sequence that the GC writes a *forwarding pointer*.<br>b. The debugger must handle specially any user request to watch an object field in which the GC happens to use also for storing forwarding information. |
| VM memory occupied (1 = most) | 1:<br>*Relocation table* | 3:<br>Single entry of old/new addresses | 2:<br>*Relocation card table* | 4:<br>No additional memory |
| Accuracy (1 = most) | 2:<br>Object watchpoint implementation is incorrect from the moment of relocation until the completion of the GC cycle. | 1:<br>Object watchpoint implementation always correct, except during object relocation. | 1:<br>Object watchpoint implementation always correct, except during object relocation. | 1:<br>Object watchpoint implementation is always correct, except during object relocation. |

FIG. 11C

TRACKING OBJECT FIELDS USING RELOCATABLE OBJECT WATCHPOINTS

BACKGROUND

A virtual machine (VM) is a software implementation of a physical machine (i.e., a computer system) that executes software instructions in a manner identical to the physical machine In other words, a VM is an efficient, isolated duplicate of a physical machine VMs usually exist in two varieties—system VMs and process VMs. A system VM acts as a comprehensive system platform that supports the execution of an operating system (OS). A process VM runs a single program (i.e., it supports a single process). Software executing in a VM is limited to the resources and abstractions provided by that VM. In other words, the software cannot operate or access elements outside of the VM. VMs typically store objects in a region of VM memory referred to as a memory heap.

Garbage collection is a mechanism used for memory management in computer systems. A garbage collector functions by reclaiming memory (e.g., in the memory heap) occupied by objects that are no longer in use by an application or computer system (i.e. garbage). During the process of garbage collection, a garbage collector may relocate a live object (i.e., non-garbage) within the memory heap of the VM. When garbage collection is occurring, the state of the VM and the heap (and therefore the objects in the heap) are opaque to a user. In other words, during garbage collection, the internal state of the VM is usually not accessible outside of the VM.

A debugger is a tool (e.g., a software application) for testing and debugging programs and/or VMs executing the programs. Specifically, a debugger allows a user to observe and/or modify the internal state of a process (i.e., VM and program) including the value(s) stored at one or more locations in memory (e.g., a memory heap). A debugger also allows a user to set memory watchpoints on specific memory locations (or breakpoints on specific portions of executing code). When the process reads from and/or writes to a memory location associated with a memory watchpoint or breakpoint, the process may be halted for user inspection and debugging.

SUMMARY

In general, in one aspect, the invention relates to a method for managing an object watchpoint during a garbage collection cycle. The method comprises identifying an object having a field, wherein the object is associated with an original object location, wherein the field is associated with an original field location, and wherein the object and the field are located in a memory heap of a virtual machine memory, setting, within a debugger, the object watchpoint on the original field location, wherein the object watchpoint is a memory trap associated with the object, determining, after a relocation of the object by a garbage collector (GC), a new object location associated with the object, determining a new field location of the field based on the new object location, and setting, within the debugger, the object watchpoint on the new field location.

In general, in one aspect, the invention relates to a system for managing an object watchpoint during a garbage collection cycle. The system comprises a memory heap of a virtual machine memory comprising an object having a field, wherein the object is associated with an original object location, and wherein the field is associated with an original field location, a garbage collector (GC) configured to execute a relocation of the object in the memory heap, and a debugger configured to set the object watchpoint on the original field location, wherein the object watchpoint is a memory trap associated with the object, determine a new object location associated with the object after the relocation, determine a new field location of the field based on the new object location, and set the object watchpoint on the new field location.

In general, in one aspect, the invention relates to a computer readable medium storing instruction to manage an object watchpoint during a garbage collection cycle. The instructions comprising functionality to identify an object having a field, wherein the object is associated with an original object location, wherein the field is associated with an original field location, and wherein the object and the field are located in a memory heap of a virtual machine memory, set, within a debugger, the object watchpoint on the original field location, wherein the object watchpoint is a memory trap associated with the object, determine, after a relocation of the object by a garbage collector (GC), a new object location associated with the object, determine a new field location of the field based on the new object location, and set, within the debugger, the object watchpoint on the new field location.

Other aspects of the invention will be apparent from the following description and the appended claims.

BRIEF DESCRIPTION OF DRAWINGS

FIGS. 11A, 11B, and 11C show matrices in accordance with one or more embodiments of the invention.

DETAILED DESCRIPTION

Figure 1:
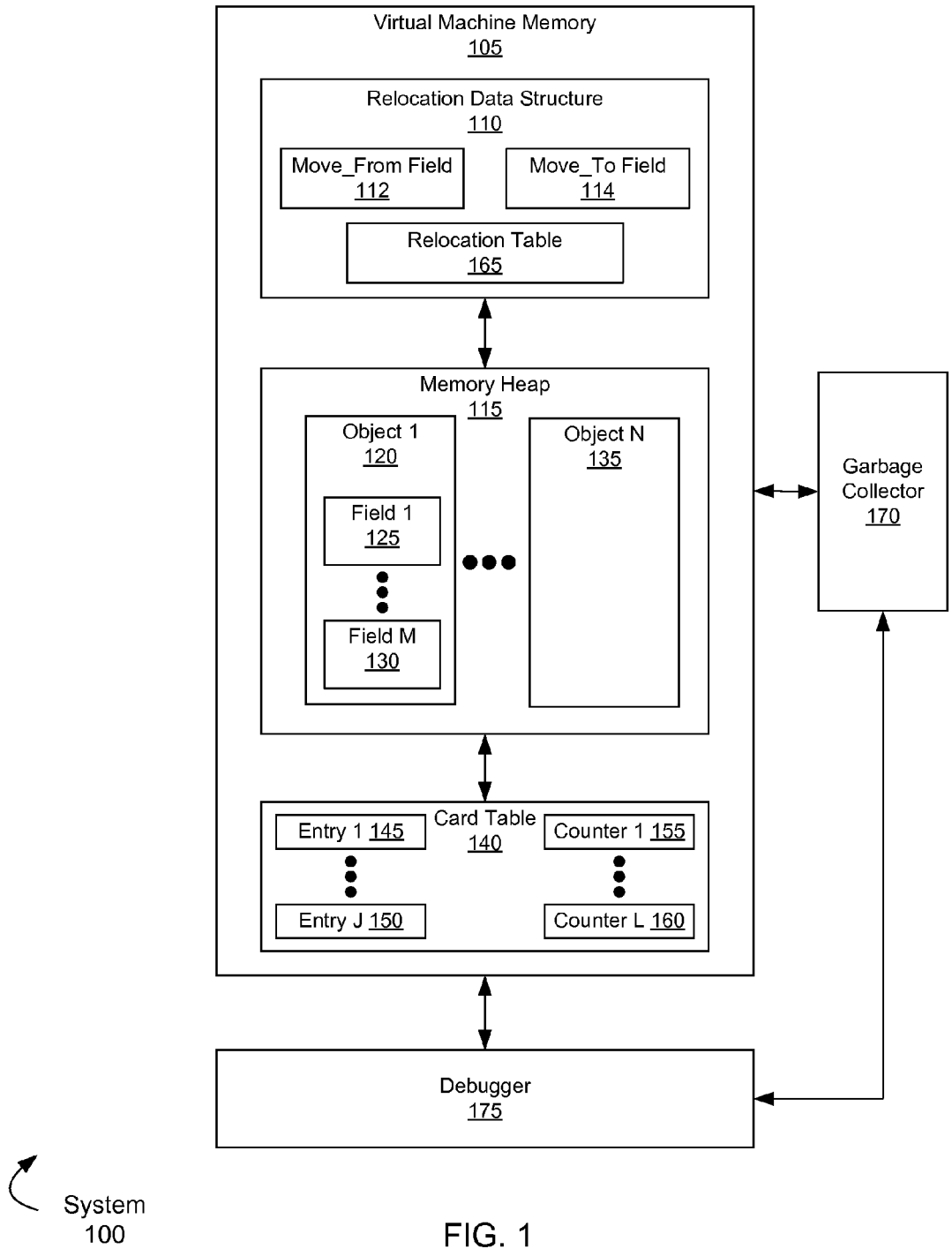
FIGS. 1 and 2 show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing an object watchpoint before, during, and/or following a garbage collection cycle. Managing the object watchpoint may include relocating the object watchpoint in response to the corresponding object being relocated during the garbage collection cycle. Moreover, managing the object watchpoint may also include setting a hidden watchpoint on a predetermined memory location, catching a hidden watchpoint event triggered by a garbage collector touching the predetermined memory location, and then accessing a relocation data structure, a memory heap, and/or a card table to determine whether relocation of the corresponding object has occurred, and thus whether relocation of the object watchpoint is necessary.

Objects in dynamically managed heap memory are subject to relocation under some implementations of garbage collection. Memory watchpoints intended to cover one or more fields of such an object (i.e. object watchpoints) are fundamentally different than address based watchpoints because the intention of the programmer concerns the object and its fields, as opposed to the address at which it may be residing temporarily. It is thus desirable that such an object watchpoint be adjusted to reflect the new location any time that the object is relocated in memory. Memory management mechanisms are complex and performance-critical, however, so it is undesirable to perturb those mechanisms in any way, either by adding complexity or performance overhead, in order to support object watchpoint relocation. With a small amount of passive (nearly cost-free) collaboration from the memory management implementation, a debugger of the invention can use the object watchpoint mechanism to detect object relocation in a timely way and to adjust object watchpoint locations as needed. Furthermore, this must be done in such a way that runtime cost does not become prohibitive as heap size and number of object watchpoints grow large.

FIG. 1 shows a system (100) in accordance with one or more embodiments of the invention. As shown in FIG. 1, the system (100) has multiple components including a virtual machine memory (105) storing a relocation data structure (110), a memory heap (115), and a card table (140); a garbage collector (170); and a debugger (175). These components are described below and may be located on the same device (e.g. a server, mainframe, desktop Personal Computer (PC), laptop, Personal Digital Assistant (PDA), telephone, mobile phone, smart phone, kiosk, cable box, or any other hardware device) or may be located on separate devices connected by a network (e.g. the Internet), with wired and/or wireless segments. In one or more embodiments of the invention, the system (100) includes more than one virtual machine memory, relocation data structure, memory heap, card table, and relocation table, as well as more than one debugger and garbage collector interfacing with those components.

An object is an instantiation of a class in an object oriented programming (OOP) language paradigm. That is, it is a chunk of memory storing the data of the fields and/or elements (e.g. variables, methods, constructors, pointers, data structures, and the like) of a class instance. In one or more embodiments of the invention, the memory heap (115) stores one or more objects (i.e., Object 1 (120) to Object N (135)). Moreover, the objects (i.e., Object 1 (120) to Object N (135)) in the memory heap (115) may each have one or more fields. For example, the object 1 (120) has multiple fields (i.e., Field 1 (125) to Field M (130)). Those skilled in the art, having the benefit of this detailed description, will appreciate that the memory heap (115) may also be referred to as a heap, a VM heap, a VM memory heap, and so on.

In one or more embodiments of the invention, the garbage collector (170) may update a garbage collector counter (not shown). As described above, garbage collection is a mechanism used to reclaim memory being occupied by objects that are no longer used and/or no longer reachable within the memory heap (115). At the conclusion of a garbage collection cycle, the garbage collector (170) may access the garbage collection counter within the VM memory (105). Those skilled in the art, having the benefit of this detailed description, will appreciate that the garbage collector (170) may be implemented using a variety of well known techniques, and may access a variety of data structures in the VM machine memory (105) including the card table (140) and/or the relocation data structure (110) (discussed below).

As also discussed above, garbage collection may include relocating live objects (i.e., objects in use, reachable objects, etc.) from original locations (i.e., original object locations) to new locations (i.e., new object locations) within the memory heap (115). In one or more embodiments of the invention, a forwarding pointer is stored in the memory heap (115) and references the new location of a relocated object (e.g., the new location of said object). Specifically, as part of the relocation process, the forwarding pointer may be stored in an original location occupied by the object (i.e., a location occupied by the object prior to relocation of the object). For example, the forwarding pointer may be stored in the original location of the object's header.

In one or more embodiments of the invention, the relocation data structure (110) includes a move_from field (112) and a move_to field (114). The move_to field (114) records the new location of an object (e.g., Object 1 (120), Object N (135)) in the memory heap (115) after the object is relocated by the garbage collector (170) during a garbage collection cycle. The move_from field (112) records the original location of the object in the memory heap prior to relocation of the object. In one or more embodiments of the invention, the garbage collector (170) writes the values to the move_from field (112) and move_to field (114) after relocating the object. Further, following the relocation of a new object, the existing values in the move_from field (112) and the move_to field (114) may be overwritten.

In one or more embodiments of the invention, the relocation data structure (110) includes a relocation table (165). The relocation table (165) is a data structure used by the VM and garbage collector (170) to record the original locations in the memory heap (115) and the new locations in the memory heap (115) of all objects relocated during a garbage collection cycle. Accordingly, the relocation table (165) may include data structures of various types, including arrays, lists, fields, and the like. In one or more embodiments of the invention, as part of the relocation process, the garbage collector (170) writes the original location value and new location value of a relocated object to an entry in the relocation table (165).

In one or more embodiments of the invention, the memory heap (115) is logically partitioned into equal sized memory chunks called "cards". Specifically, each card corresponds to multiple locations (i.e., multiple words) within the memory heap (115). As shown in FIG. 1, the card table (140) includes multiple entries (i.e., Entry 1 (145) to Entry J (150)) corresponding to the multiple cards. In one or more embodiments of the invention, when relocating an object in the heap memory (115) during a garbage collection cycle, the garbage collector (170) touches (i.e., accesses) the entry of the card corresponding to original object location (i.e., the location of the object prior to relocation) (discussed below).

Figure 2:
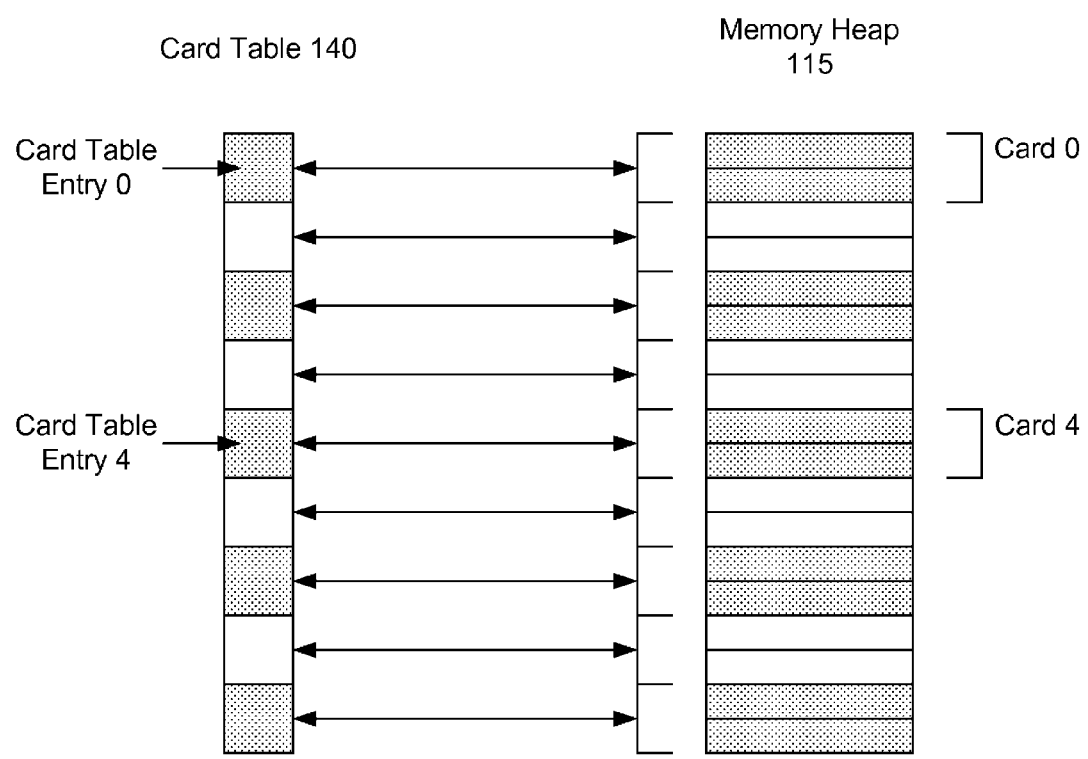

FIG. 2 details the card table (140) in accordance with one or more embodiments of the invention. As described above, the card table (140) provides a more abstracted view of the memory heap (115) than individual addressable memory locations. Specifically, the card table (140) may contain card table entries (e.g. card table entry 0, card table entry 4) that correspond to M units of memory in the memory heap (115). For example card table entry 0 may correspond to two words of memory in the memory heap (115), which is represented as a card (i.e. card 0). Similarly, card table entry 4 may correspond to 1024 words of memory in card 4 of the memory heap (115). Therefore, the card table (140) maps regions of the memory heap (115) (i.e., cards) to card table entries. Those skilled in the art will appreciate that there are other implementations of card table (140) not described.

As mentioned above, when relocating an object in the memory heap (115) during a garbage collection cycle, the garbage collector (170) reads the entry of the card corresponding to original object location (i.e., the location of the object prior to relocation). For example, consider the scenario where an object is initially located in card 4, and then relocated into card 0 during a garbage collection cycle. In such a scenario, the garbage collector will read the card table entry 4 after the relocation of the object, because the object (or at least the object's header) was initially located within card 4 of the memory heap (115).

Referring back to FIG. 1, like the relocation data structure (110), the card table (140) is allocated in VM memory (105), but not on the garbage-collected memory heap (115), so that it does not perturb the normal operation of an application or the garbage collector (170). The ratio of how many words in the memory heap (115) are referred to by one word in the card table (140) is configurable and allows control of a time-space tradeoff. Therefore, the card table (140) provides a bi-directional mapping between regions in memory heap (115) of M heap words to 1 card table word. Those skilled in the art will appreciate that there are other implementations of the card table not discussed.

In one or more embodiments of the invention, the debugger (175) is a tool (e.g., a software application) for testing and debugging an execution of the VM. Specifically, a debugger allows a user to observe and/or modify the internal state of a process (i.e., VM and program) including the value(s) stored at one or more locations in the memory heap (115). The debugger (175) may present results derived from observations of the VM in a graphical or tabular format, and does not intrude on or disturb the operations of the VM.

A physical watchpoint is an operating system level mechanism (that potentially uses hardware support) for stopping a program when a specified memory location is read, written or executed (i.e. accessed). Note that a watchpoint at this level is associated with exactly one memory location which does not change. That is, a physical watchpoint is defined in terms of the fixed, physical address being watched.

A debugger may also offer support for a more abstract type of watchpoint where a logical program entity (e.g. an object, a variable) is being observed. This is called an object watchpoint and it is implemented in terms of one or more physical watchpoints. The physical memory underlying a program entity change throughout the lifetime of the entity and accordingly, the physical watchpoint(s) implementing an object watchpoint may change throughout the lifetime of the object watchpoint.

A physical watchpoint set by the debugger tool to implement an object watchpoint is called a hidden memory watchpoint (also known as a hidden watchpoint). That is, a hidden watchpoint is always a physical watchpoint but the inverse is not necessarily true. The user of the debugger may set a physical watchpoint on an arbitrary memory location.

In one or more embodiments of the invention, the debugger (175) includes functionality to set hidden watchpoints on specific locations (i.e., predetermined memory locations) within the VM memory (105) including the move_from field (112), the move_to field (114), entries in the card table (140), locations in the memory heap (115), and the garbage collection counter (not shown). These predetermined memory locations are touched by the garbage collector (170) during a garbage collection cycle and/or upon completion of a garbage collection cycle. When one of these specific memory locations is touched by the garbage collector (170), a hidden watchpoint event is triggered. Accordingly, the debugger (175) also includes functionality to catch hidden watchpoint events.

In one or more embodiments of the invention, the debugger (175) includes functionality to set object watchpoints (i.e., relocatable memory watchpoints) for objects or object-related data allocated in the memory heap (115), and functionality to manage these watchpoints as an out-of-process application. Object watchpoints are memory watchpoints set on (i.e. linked to, associated with) objects, either on a specific field or a subset of fields in the object. Object watchpoints are useful in that they automatically follow their corresponding ("watched") objects/fields whenever the watched objects are relocated by garbage collection.

In one or more embodiments of the invention, the debugged program may be an application program or the VM itself. For example, the debugged program may be a meta-circular VM in which critical information about the state of the VM itself is stored uniformly as objects in the heap. The debugged process itself (e.g. the VM or the program) might not know anything about existing watchpoints in the debugger (175) (i.e. it is a non-cooperative design). Furthermore, no additional memory allocations on the garbage-collected heap (i.e., Memory Heap (115)) in the VM should be required for watchpoint purposes. If any kind of dynamic memory is needed to support the watchpoints, it must be allocated in a special memory region that is not seen by the garbage collector. This standard should be maintained so that the VM heap state is not changed. The watchpoint tracking mechanism maintained by the debugger should be fast and scale efficiently with the number of watchpoints and the size of the VM heap. Those skilled in the art will appreciate that the debugger may be implemented by numerous other techniques not described. A debugger utilizing the embodiments described may also be referred to as an "Inspector".

Figure 3:
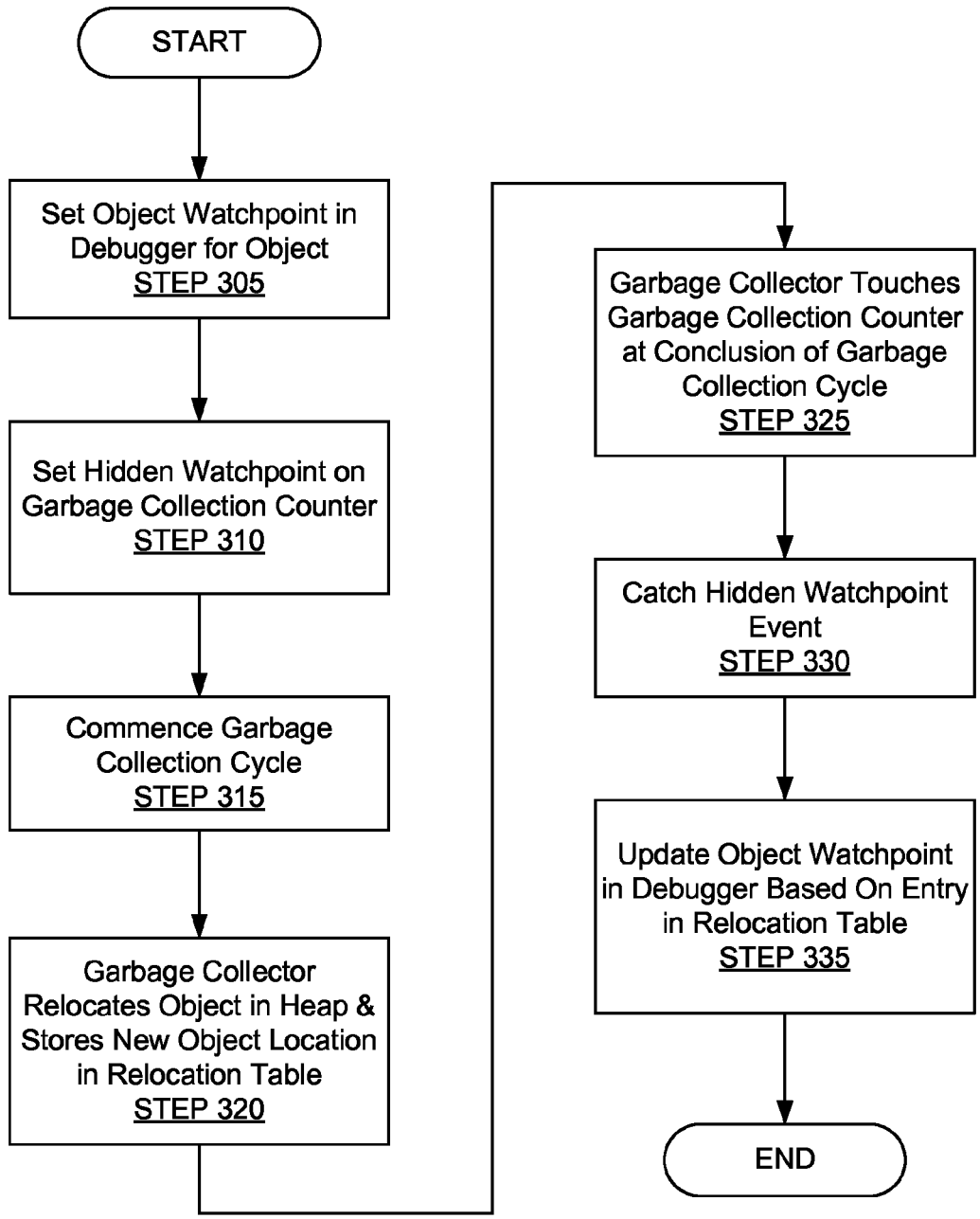
FIGS. 3, 5, 7, and 9 show flowcharts in accordance with one or more embodiments of the invention.

FIG. 3 shows a flowchart in accordance with one or more embodiments of the invention. The process shown in FIG. 3 may be used, for example, with the system (100) (discussed above in reference to FIG. 1), to manage an object watchpoint before, during, and/or following a garbage collection cycle. Those skilled in the art, having the benefit of this detailed description, will appreciate that the sequence of steps shown in FIG. 3 may differ among embodiments of the invention, and that one or more of the steps may be repeated or omitted.

In STEP 305, an object watchpoint is set, within a debugger, on one or more fields of an object in a memory heap (i.e., set on an original field location). Accordingly, the location of the object watchpoint within the object may be defined in terms of the object address plus an offset. Object watchpoints may also be known as logical watchpoints. As discussed above, the object watchpoint captures the intent of the debugger user to track the field and/or the object during one or more garbage collection cycles. That is, an object watchpoint tracks the logical location of interest across one or more garbage collector cycles, even if a garbage collector cycle relocates the objects and this changes the physical memory location implementing the logical object location. In one or more embodiments of the invention, the memory heap is part of a VM memory having a relocation table (discussed above in reference to FIG. 1).

In STEP 310, a hidden watchpoint is set on a garbage collection counter within the VM memory. As discussed above, the garbage collection counter is touched (i.e., incremented) by the garbage collector at the conclusion of a garbage collection cycle. As also discussed above, the garbage collection counter is an example of a predetermined memory location which, upon being touched, triggers a hidden watchpoint event. For example, a trigger may be set by the debugger to stop the VM upon completion of a garbage collector cycle. The trigger may be either a physical watchpoint on a memory location known to be read and/or written by the garbage collector upon completion of a garbage collector (e.g. the garbage collector counter) or a breakpoint on some code location known to be executed upon completion of the garbage collector cycle (e.g. first instruction in the method that updates the garbage collector counter). This trigger is invisible to the user of the debugger. In general, a hidden watchpoint is typically invisible to a user and set in response to setting the object watchpoint.

In STEP 315, a garbage collection cycle is commenced. During the garbage collection cycle, objects stored in the heap memory may be relocated from original object locations to new object locations within the heap memory.

In STEP 320, the object tracked by the object watchpoint is relocated in the memory heap during the garbage collection cycle. The original object location and the new object location (i.e. the locations of the object in the memory heap before and after relocation by the garbage collector) are stored in an entry in the relocation table.

In STEP 325, at the conclusion of the garbage collection cycle, the garbage collection counter is updated (e.g. touched) by the garbage collector. As discussed above, a trigger is fired (e.g. a hidden watchpoint event is triggered) that stops the VM immediately after the counter is updated.

In STEP 330, the trigger event is caught by the debugger. In response, the debugger searches the relocation table for an entry storing the original location of the object (i.e., the original object location) tracked by the object watchpoint. The matching entry will also store the new location of the object (i.e., the new object location) tracked by the object watchpoint. In other words, the new location of the object being tracked by the object watchpoint may be determined by accessing the entry in the relocation table corresponding to the object.

In STEP 335, the object watchpoint is set within the debugger to the new location of the field (i.e., the new field location). In one or more embodiments of the invention, setting the object watchpoint on the new field location includes determining the new field location based on the mentioned offset and the new object location stored in the matching entry in the relocation table.

In view of FIG. 3, each object watchpoint may be updated at the end of each garbage collection cycle if the objects being tracked by the object watchpoints are relocated during the garbage collection cycle. Advantages of this implementation include efficiency, because the algorithm only stops the VM when at least one object watchpoint is set, and it performs all updates to object watchpoints at the conclusion of the garbage collection phase. Those skilled in the art will appreciate that the process detailed above may also be described from the point of view of the debugger.

Figure 4:
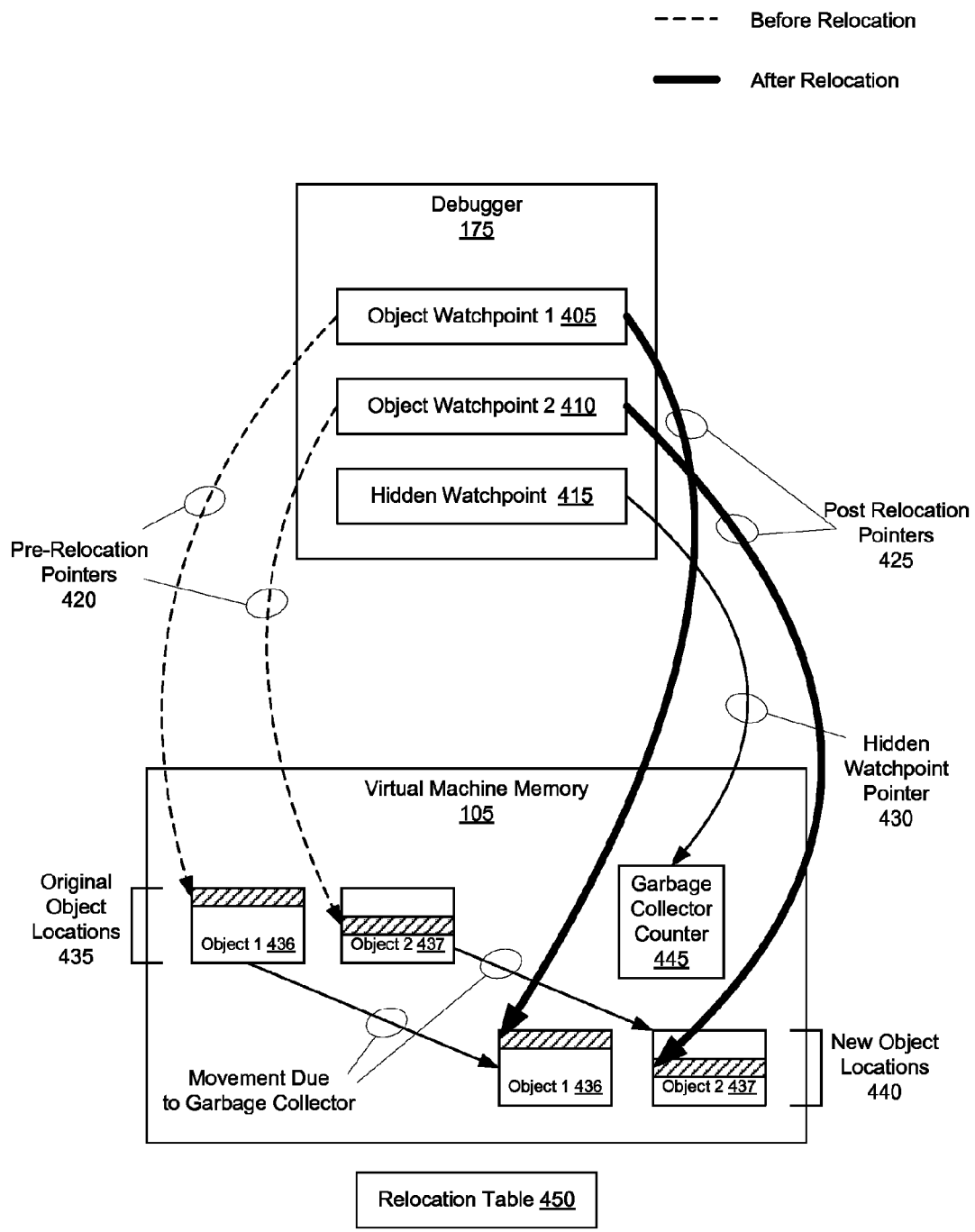
FIGS. 4, 6, 8, and 10 show examples in accordance with one or more embodiments of the invention.

FIG. 4 shows an example in accordance with one or more embodiments of the invention. The example shown in FIG. 4 may correspond to the process described above in reference to FIG. 3. Those skilled in the art will appreciate that the sequence of steps shown in FIG. 4 may differ among embodiments of the invention, and that one or more of the steps may be optional.

As shown in FIG. 4, the debugger (175) may contain the object watchpoint 1 (405), the object watchpoint 2 (410), and the hidden watchpoint (415). Prior to relocation of the object 1 (436) and the object 2 (437), the object watchpoint 1 (405) and the object watchpoint 2 (410) may reference the object 1 (436) and the object 2 (437) in the virtual machine memory (105), respectively, using the pre-relocation pointers (420). The hidden watchpoint (415) may reference the garbage collector counter (445) (i.e., a predetermined memory location) through the hidden watchpoint pointer (430). Initially, object 1 (436) and object 2 (437) are stored at original object locations (435) in virtual machine memory (105). As mentioned above, the original object location of an object is the location at which the object is stored in the VM memory (105) before being relocated by the garbage collector. During a garbage collection cycle, the garbage collector may relocate objects 1 (436) and 2 (437) to new object locations (440). Even though the objects are now in new memory locations, as long as the garbage collector is still performing garbage collection, object watchpoints 1 (405) and 2 (410) still point to the original object locations (435).

In accordance with one or more embodiments of the invention, when the garbage collector finishes the current garbage collection cycle, the garbage collector accesses the garbage collector counter (445) in order to update it. This triggers (i.e. enacts, sets off, causes) a hidden watchpoint event, which the debugger (175) then catches (i.e. identifies, detects, recognizes, becomes aware of). It is only after the garbage collection cycle finishes that object watchpoints 1 (405) and 2 (410) are updated to reference (through post relocation pointers (425)) the new object locations (440). When there are no more object watchpoints, then hidden watchpoint (415) may be removed. The original object locations (435) and new object locations (440) of object 1 (436) and object 2 (437) are recorded in relocation table (450). In order to update object watchpoint 1 (405) and object watchpoint 2 (410), the new object locations (440) are read from relocation table (450).

Figure 5:
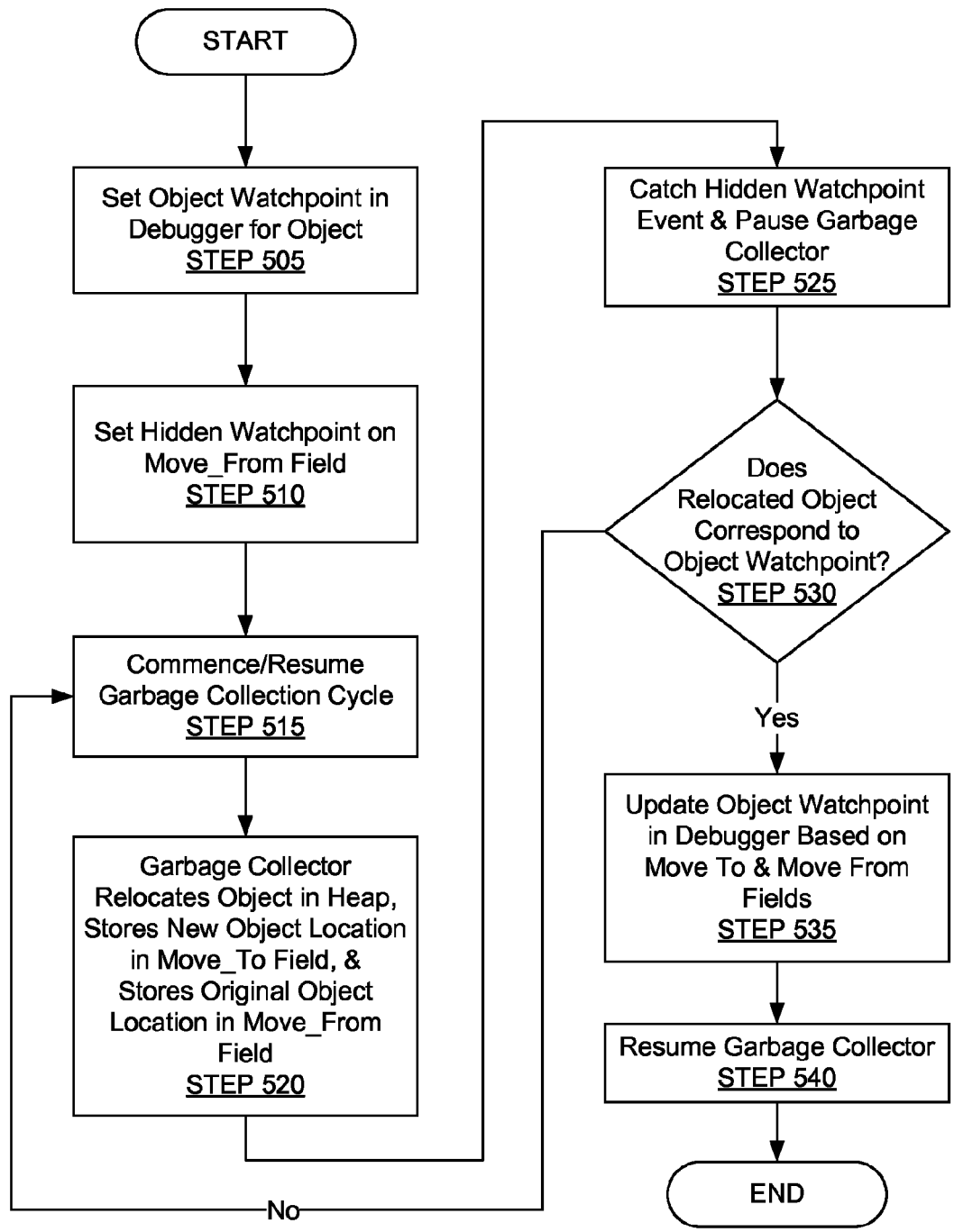

FIG. 5 shows a flowchart in accordance with one or more embodiments of the invention. The process shown in FIG. 5 may be used, for example, with the system (100), to manage an object watchpoint before, during, and/or following a garbage collection cycle. Those skilled in the art, having the benefit of this detailed description, will appreciate that the sequence of steps shown in FIG. 5 may differ among embodiments of the invention, and that one or more of the steps may be repeated or omitted.

In STEP 505, an object watchpoint is set, within a debugger, on a field of an object in a memory heap (i.e., set on an original field location). Accordingly, the location of the object watchpoint within the object may be defined using an offset from the header of the object. As discussed above, the object watchpoint may be a mechanism set by the user to track the field and/or the object during one or more garbage collection cycles within a memory heap. In one or more embodiments of the invention, the memory heap is part of a VM memory having a move_from field and a move_to field (discussed above in reference to FIG. 1).

In STEP 510, a hidden watchpoint is set on the move_from field within the VM memory. Alternatively, the hidden watchpoint may be set on the move_to field within the VM memory. As discussed above, the garbage collector writes the original location of an object (i.e., original object location) in the move_from field and writes the new location of the object (i.e., new object location) in the move_to field during and/or following relocation of an object during a garbage collection cycle. As also discussed above, the move_from field and/or the move_to field are examples of predetermined memory locations which, upon being touched, trigger a hidden watchpoint event. A hidden watchpoint is typically invisible to a user and set in response to setting the object watchpoint. Alternatively, a breakpoint could be used on a predetermined code location that is known to be executed at the desired point during object relocation instead of the hidden watchpoint.

In STEP 515, a garbage collection cycle is commenced or resumed. The garbage collection cycle is commenced if the process proceeded from STEP 510. Otherwise, the garbage collection cycle is resumed because the process proceeded from STEP 530.

In STEP 520, an object is relocated within the memory heap by the garbage collector during the garbage collection cycle. During and/or after the relocation, the garbage collector writes the new location of the object (i.e., new object location) to the move_to field and the original location of the object (i.e., original object location) in the move_from field. By writing to the move_to field and/or the move_from field, a hidden watchpoint event is triggered.

In STEP 525, the hidden watchpoint event is caught (e.g., by the debugger) and the garbage collector is paused. In STEP 530, it is determined whether the relocated object corresponds to the object being tracked by the object watchpoint. If a positive determination is made (i.e., the relocated object is the object being tracked by the object watchpoint), then the process proceeds to STEP 535. In one or more embodiments of the invention, a positive determination is made by reading the value in the move_from field after pausing the garbage collection cycle, and by matching the value to the original location of the object (i.e., original object location) tracked by the object watchpoint. If a negative determination is made (i.e., the relocated object is not the object being tracked by the object watchpoint), then the process proceeds back to STEP 515 to resume the garbage collection cycle.

In STEP 535, the object watchpoint is set within the debugger to the new location of the field (i.e., the new field location). In one or more embodiments of the invention, setting the object watchpoint on the new field location requires determining the new field location based on the mentioned offset and the new object location stored in the move_to field.

In STEP 540, the garbage collector is resumed. Specifically, the garbage collection cycle that was paused in STEP 525 is resumed. Those skilled in the art, having the benefit of this detailed description, will appreciate that an advantage of this embodiment of the invention is that object watchpoints always point to the latest object locations.

Figure 6:
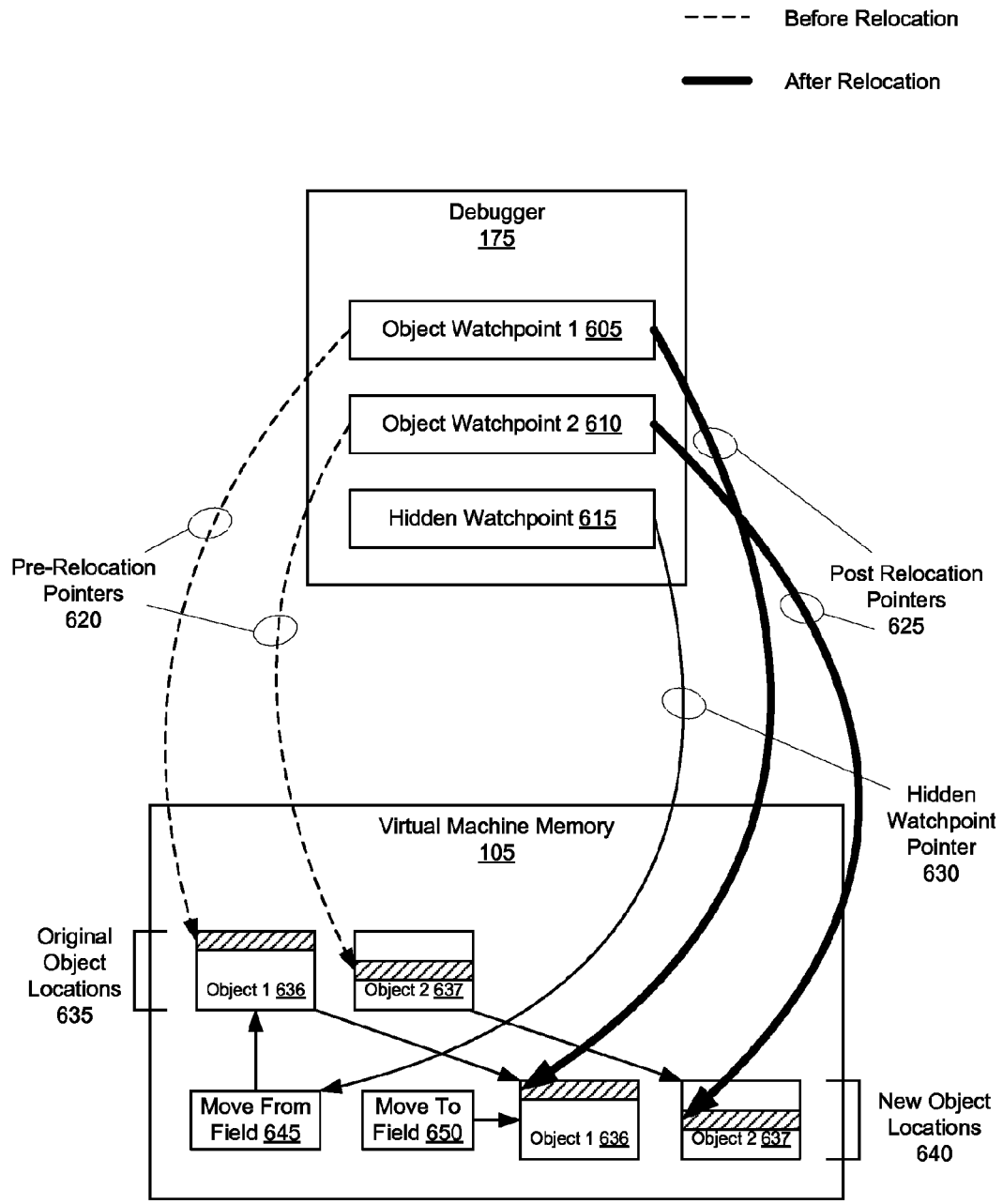

FIG. 6 shows an example in accordance with one or more embodiments of the invention. The example shown in FIG. 6 may correspond to the process described above in reference to FIG. 4. Those skilled in the art will appreciate that the sequence of steps shown in FIG. 6 may differ among embodiments of the invention, and that one or more of the steps may be optional.

As shown in FIG. 6, the debugger (175) includes the object watchpoint 1 (605), the object watchpoint 2 (610), and the hidden watchpoint (615). The object watchpoint 1 (605) and the object watchpoint 2 (610) reference the object 1 (636) and the object 2 (637), respectively, within the virtual machine memory (105) through the pre-location pointers (620). Those skilled in the art, having the benefit of this detailed description, will appreciate that the objects may initially be located anywhere in the heap of the VM memory. The hidden watchpoint (615) is set on the move_from field (645). Alternatively, the hidden watchpoint (615) may be set on the move_to field (650). Initially, the object 1 (636) and the object 2 (637) are stored at the original object locations (635) in the virtual machine memory (105). During a garbage collection cycle, the garbage collector may relocate the object 1 (636) and the object 2 (637) to new object locations (640).

In one or more embodiments of the invention, when relocation of the object 1 (636) or the object 2 (637) occurs, the garbage collector writes the original object location in the move_from field (645) and the new object location in the move_to field (650). This in turn triggers a hidden watchpoint event, which the debugger (175) then catches. After the hidden watchpoint event is caught, the object watchpoints 1 (605) and 2 (610) are updated to reference (through post relocation pointers (625)) the new memory locations (640) of objects 1 (636) and 2 (637). Specifically, the move_to field (650) is accessed to determine the new object locations of the object 1 (636) and the object 2 (637). The hidden watchpoint pointer (630) may continue to reference the move_from field (645) as long as one object watchpoint remains. When there are no more object watchpoints, the hidden watchpoint (615) may be removed.

Figure 7:
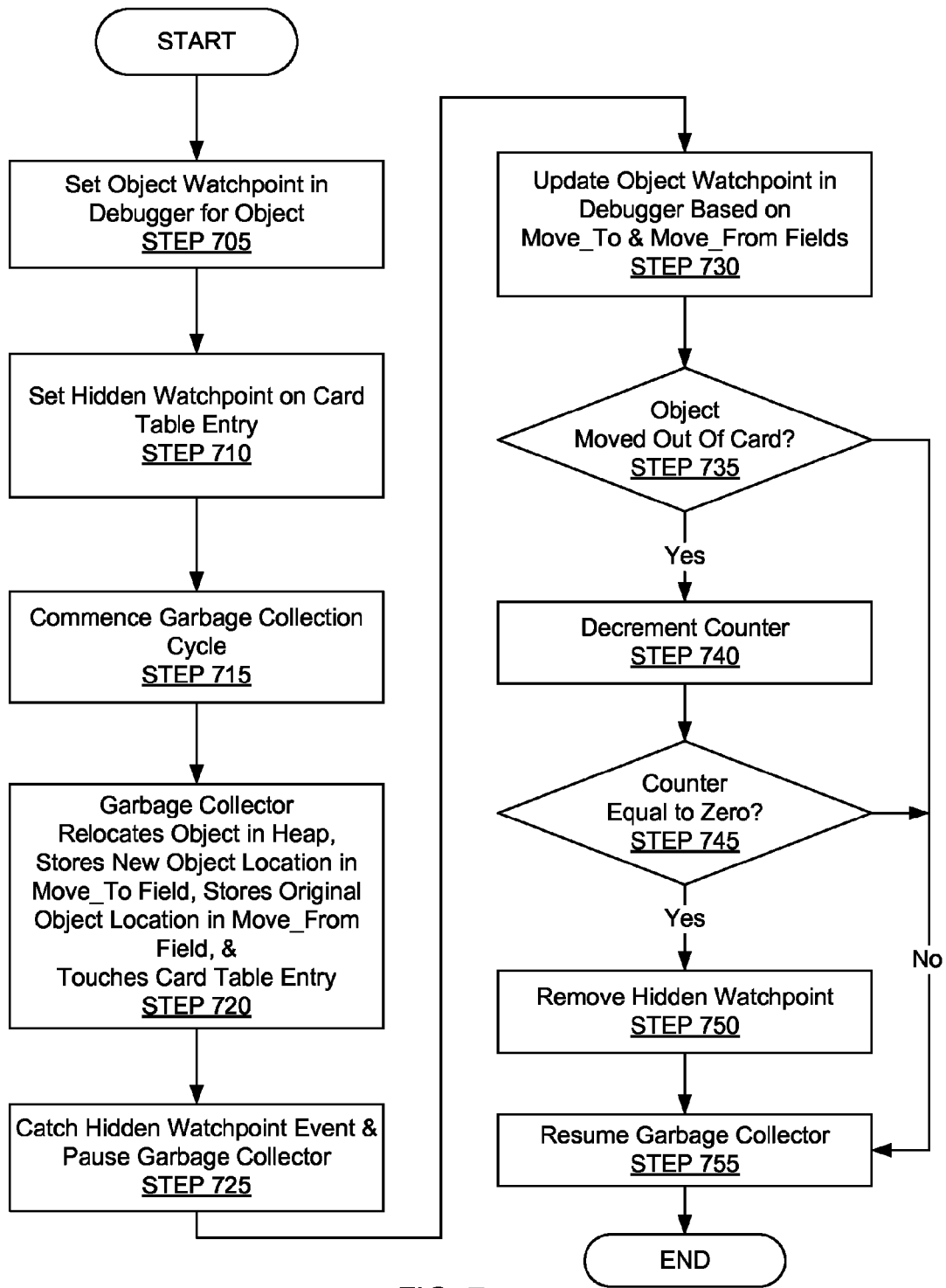

FIG. 7 shows a flowchart in accordance with one or more embodiments of the invention. The process shown in FIG. 7 may be used, for example, with the system (100), to manage an object watchpoint before, during, and/or following a garbage collection cycle. Those skilled in the art, having the benefit of this detailed description, will appreciate that the sequence of steps shown in FIG. 7 may differ among embodiments of the invention, and that one or more of the steps may be repeated or omitted.

In STEP 705, an object watchpoint is set, within a debugger, on a field of an object in a memory heap (i.e., set on an original field location). Accordingly, the location of the object watchpoint within the object may be defined using an offset from the header of the object. As discussed above, the object watchpoint may be a mechanism set by the user to track the field and/or the object during one or more garbage collection cycles within a memory heap. In one or more embodiments of the invention, the memory heap is part of a VM memory having a move_from field, a move_to field, and a card table storing multiple card entries and counters (discussed above in reference to FIG. 1).

In STEP 710, a hidden watchpoint is set on the card table entry corresponding to the card having the object (or at least the header of the object). As discussed above, during and/or following relocation of an object during a garbage collection cycle, the garbage collector touches the card table entry corresponding to the card having the object (or at least the header of the object). As also discussed above, the garbage collector writes the original location of an object (i.e., original object location) in the move_from field and writes the new location of the object (i.e., new object location) in the move_to field during and/or following relocation of an object during a garbage collection cycle. The card table entry is an example of a predetermined memory location which, upon being touched, triggers a hidden watchpoint event. A hidden watchpoint is typically invisible to a user and set in response to setting the object watchpoint.

In STEP 715, a garbage collection cycle is commenced. In STEP 720, an object is relocated within the memory heap by the garbage collector during the garbage collection cycle. During and/or after the relocation, the garbage collector writes the new location of the object (i.e., new object location) to the move_to field and the original location of the object (i.e., original object location) in the move_from field. Moreover, during and/or after the relocation, the garbage collector touches the card table entry corresponding to the card having the original object location. By touching the card table entry, a hidden watchpoint event is triggered.

In STEP 725, the hidden watchpoint event is caught, and the garbage collector is paused. The original object location of the relocation object is read from the move_from field. If the original object location does not correspond to an object being tracked by an object watchpoint, the process proceeds (not shown) to STEP 755 to resume garbage collection. However, when it is determined that the original object location read from the move_from field corresponds to an object tracked by an object location, the process proceeds to STEP 730.

In STEP 730, the object watchpoint is set within the debugger to the new location of the field (i.e., the new field location). In one or more embodiments of the invention, setting the object watchpoint on the new field location requires determining the new field location based on the mentioned offset and the new object location stored in the move_to field.

In STEP 735, it is determined whether the object has been moved out of an original card and into a new card by the garbage collector. If a positive determination is made (i.e., the object has been moved out of the original card), then the process proceeds to STEP 740. If a negative determination is made (i.e., the object has not been moved out of the original card), then the process proceeds to STEP 755.

In STEP 740, a counter keeping track of the number of tracked objects within the original card is decremented. Further, a counter keeping track of the number of tracked objects within the new card is incremented.

In STEP 745, it is determined whether the counter keeping track of the number of tracked objects within the original card is equal to zero. If a positive determination is made (i.e., the counter for the original card is equal to zero), then the process proceeds to STEP 750. If a negative determination is made (i.e., the counter for the original card is not equal to zero), then the process proceeds to STEP 755.

In STEP 750, the hidden watchpoint is removed from the card table entry because the entry corresponds to a card that no longer has any tracked objects. Accordingly, even if non-tracked objects are subsequently moved out of the card by the garbage collector, a hidden watchpoint event will not be triggered.

In STEP 755, the garbage collector is resumed. Specifically, the garbage collection cycle that was paused in STEP 725 is resumed. Those skilled in the art will appreciate that an advantage of this embodiment of the invention is that object watchpoints always point to the latest object locations. This may prove useful when the debugger is being used during garbage collection.

Figure 8:
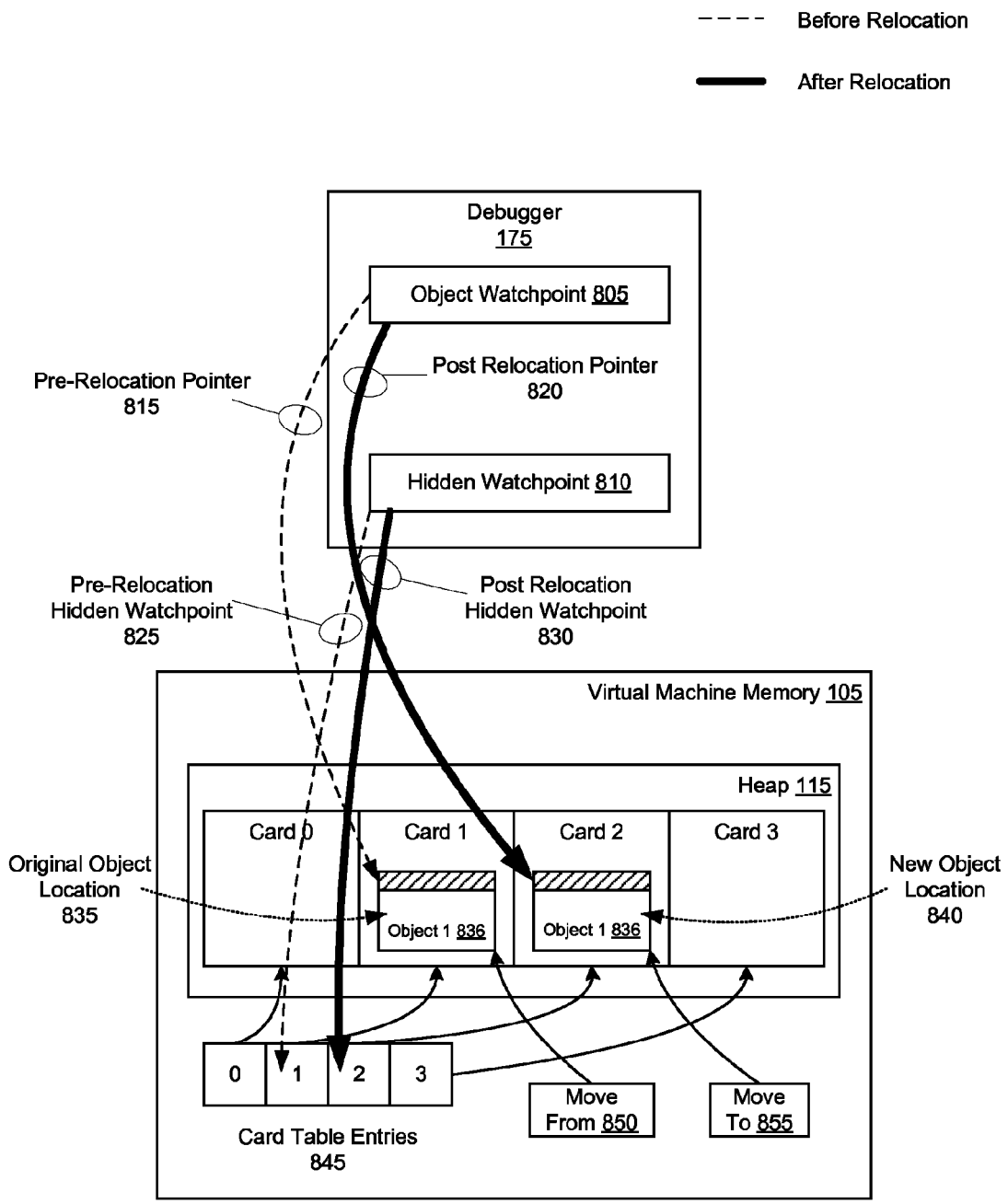

FIG. 8 shows an example in accordance with one or more embodiments of the invention. The example shown in FIG. 8 may correspond to the process described above in reference to FIG. 7. Those skilled in the art will appreciate that the sequence of steps shown in FIG. 8 may differ among embodiments of the invention, and that one or more of the steps may be optional.

As shown in FIG. 8, the debugger (175) may contain the object watchpoint (805) and the hidden watchpoint (810). The object watchpoint (805) may reference the object 1 (836) in virtual machine memory (105) through a pre-relocation pointer (815) before object relocation. The hidden watchpoint (810) may be set on the card table entry 1 of a set of card table entries (845) through a hidden watchpoint pointer before object relocation (825). Initially, object 1 (836) is stored at the original object location (835) in card 1 of the virtual machine memory (105). After commencement of the garbage collector, the garbage collector may relocate object 1 (836) to the new memory location (840) in card 2.

In one or more embodiments of the invention, when the relocation of the object 1 (836) occurs, the garbage collector writes the original object location to the move_from field (850), and writes the new object location to the move_to field (855). Moreover, the garbage collector touches the card table entry 1. This in turn triggers a hidden watchpoint event, which the debugger (175) then catches. After the hidden watchpoint event is caught, object watchpoint 1 (805) is updated to reference (through post relocation pointer (820)) the new memory location (840) of the object 1 (836). Specifically, the move_to field (855) is accessed to determine the new object location of the object 1 (836).

As shown in FIG. 8, the object 1 (836) is relocated by the garbage collector from the card 1 to the card 2. Following the relocation, the card 1 no longer has any objects being tracked by object watchpoints. Accordingly, the hidden watchpoint (810) on the card table entry 1 (845) is removed. Moreover, as the card 2 now has at least one object being tracked by an object watchpoint, the hidden watchpoint (810) is now set on the card table entry 2.

Figure 9:
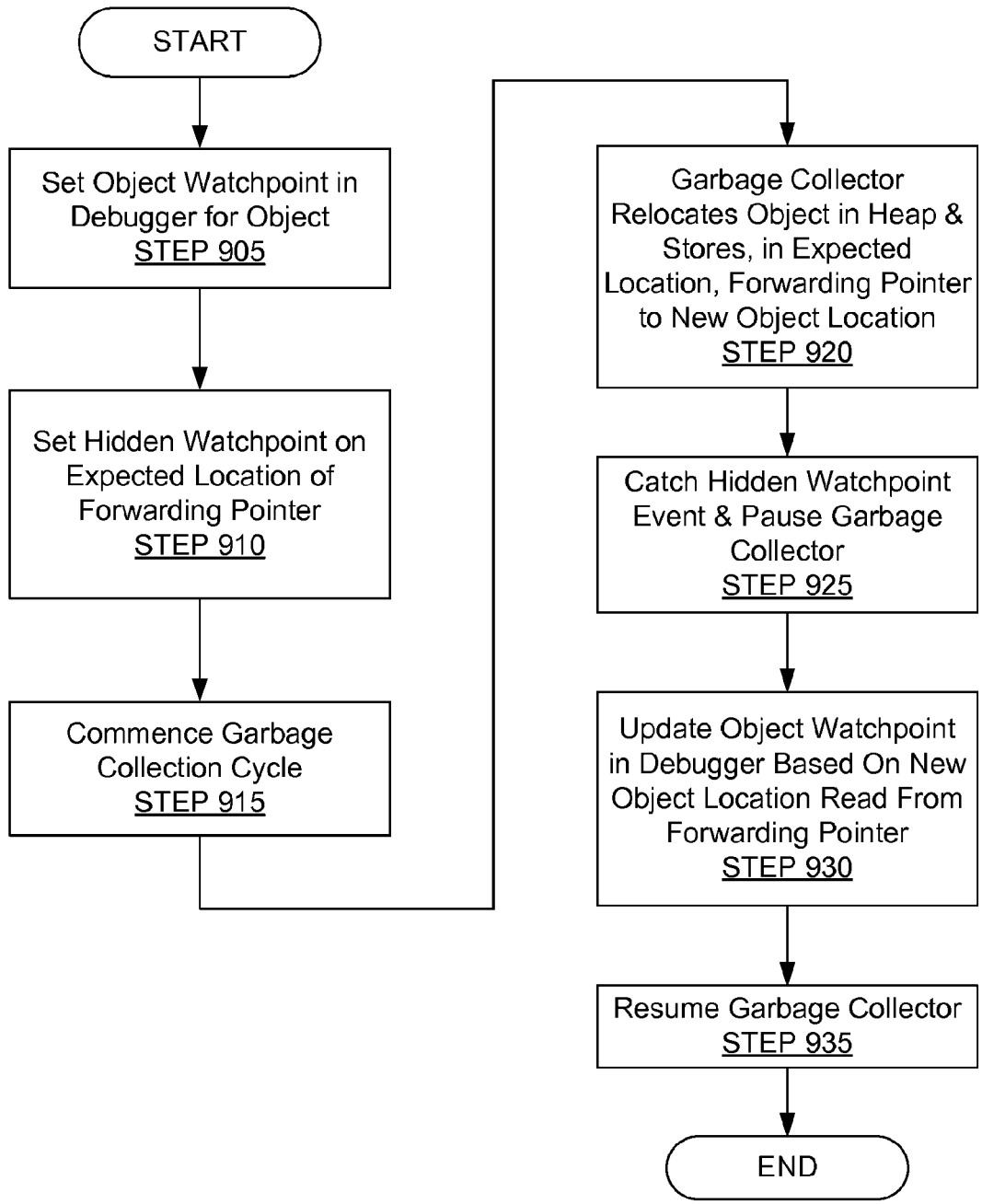

FIG. 9 shows a flowchart in accordance with one or more embodiments of the invention. The process shown in FIG. 9 may be used, for example, with the system (100), to manage an object watchpoint before, during, and/or following a garbage collection cycle. Those skilled in the art, having the benefit of this detailed description, will appreciate that the sequence of steps shown in FIG. 9 may differ among embodiments of the invention, and that one or more of the steps may be repeated or omitted.

In STEP 905, an object watchpoint is set, within a debugger, on a field of an object in a memory heap (i.e., set on an original field location). Accordingly, the location of the object watchpoint within the object may be defined using an offset from the header of the object. As discussed above, the object watchpoint may be a mechanism set by the user to track the field and/or the object during one or more garbage collection cycles within a memory heap.

In one or more embodiments of the invention, following relocation of an object during a garbage collecting cycle, the garbage collector stores a forwarding pointer in the original object location. Alternatively, the garbage collector may store the forwarding pointer in some other expected location within the range of locations previously occupied by the object. The forwarding pointer identifies the new object location of the relocated object.

In STEP 910, a hidden watchpoint is set on the expected location of the forwarding pointer for the object within the memory heap. In one or more embodiments of the invention, the expected location is the object's header. The expected location or word is an example of a predetermined memory location which, upon being touched, triggers a hidden watchpoint event. A hidden watchpoint is typically invisible to a user and set in response to setting the object watchpoint.

In STEP 915, a garbage collection cycle is commenced. STEP 915 may be essentially the same as STEP 315, discussed above in reference to FIG. 3.

In STEP 920, the object is relocated in the memory heap, and the forwarding pointer to the new object location is stored in the expected location by the garbage collector. The storage of the forward pointer is performed immediately after the relocation of the object.

In STEP 925, a hidden watchpoint event is caught, and the garbage collector is paused. The hidden watchpoint event is triggered by the garbage collector storing the forwarding pointer in the expected location. If the hidden watchpoint field lies within the watched object's memory (i.e., if the hidden watchpoint and object watchpoint overlap in memory), then the debugger must multiplex watchpoint events; if it is a relocation event it has to update the watchpoint and resume the VM, otherwise it has to stop the VM and signal the user that an object was accessed at the given memory location. The bit pattern in the word watched by the hidden watchpoint can be used to differentiate a hidden watchpoint event from an object watchpoint event. Those skilled in the art will appreciate that other mechanisms exist for differentiating a hidden watchpoint event from an object watchpoint event.

In STEP 930, the object watchpoint is set within the debugger to the new location of the field (i.e., the new field location). In one or more embodiments of the invention, setting the object watchpoint on the new field location requires determining the new field location based on the mentioned offset and the new object location referenced by the forwarding pointer.

In STEP 935, the garbage collector is resumed. Specifically, the garbage collection cycle that was paused in STEP 925 is resumed. Those skilled in the art will appreciate that an advantage of this embodiment of the invention is that object watchpoints always point to the latest object locations.

Figure 10:
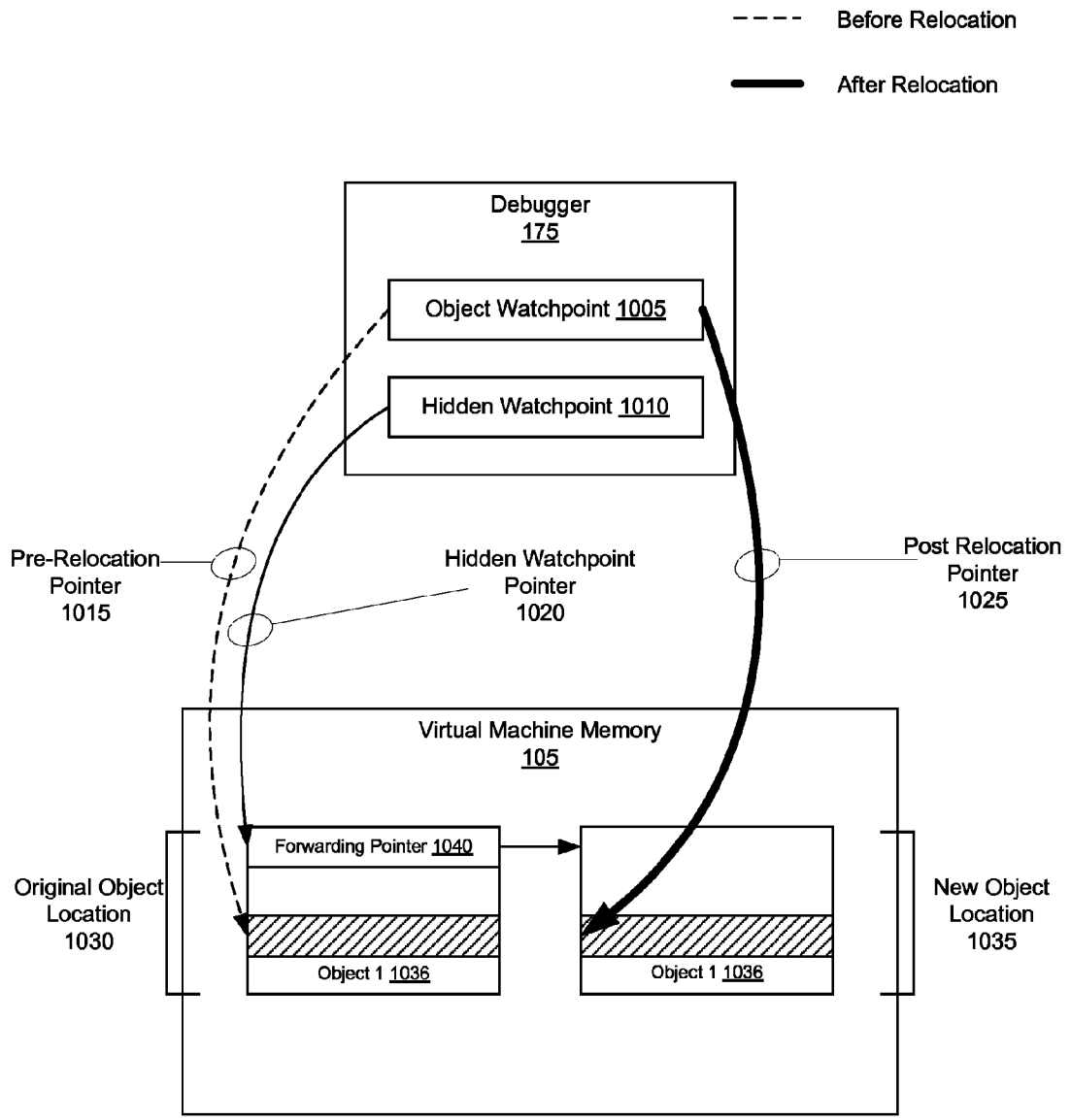

FIG. 10 shows an example in accordance with one or more embodiments of the invention. The example shown in FIG. 10 may correspond to the process described above in reference to FIG. 9. Those skilled in the art will appreciate that the sequence of steps shown in FIG. 10 may differ among embodiments of the invention, and that one or more of the steps may be optional.

As shown in FIG. 10, the debugger (175) may contain the object watchpoint (1005) and the hidden watchpoint (1010). The object watchpoint (1005) may reference the object 1 (1036) in the virtual machine memory (105) through a pre-relocation pointer (1015). The hidden watchpoint (1010) may reference the expected location of a forwarding pointer (e.g. forwarding pointer (1040)) in the object 1 (1036) through a hidden watchpoint pointer (e.g. hidden watchpoint pointer (1020)). Initially, the object 1 (1036) is stored at the original object location (1030) in the virtual machine memory (105). After commencement of the garbage collector, the garbage collector may relocate the object 1 (1036) to a new memory location (e.g. new memory location (1035)).

In one or more embodiments of the invention, when relocation of the object 1 (1036) occurs, the garbage collector stores a forwarding pointer (1040) in the expected location (e.g. the header of the object 1 (1036)). As discussed above, the forwarding pointer (1040) references the new object location. This in turn triggers a hidden watchpoint event, which the debugger (175) then catches, and pauses the garbage collection cycle. After the hidden watchpoint event is caught, the object watchpoint (1005) is updated to reference (through the post relocation watchpoint pointer (1025)) the new memory location (1035) of the object 1 (1036). This update may be based on the information stored in forwarding pointer (1040). Those skilled in the art will appreciate that this update mechanism may occur in a similar fashion for other objects upon relocation. After the update of object watchpoint (1005), hidden watchpoint (1010) may be updated to a new expected location of a forwarding pointer for object 1 (1036) at the new location of object 1 (1036). As there may be one hidden watchpoint required for each object watchpoint, hidden watchpoint (1010) may be removed from the VM memory when its corresponding object watchpoint is removed. Those skilled in the art will appreciate that the hidden watchpoint may alternatively initially point to other memory locations within the VM memory according to different implementations.

In one or more embodiments of the invention, alternate implementations of the methods previously described are possible. In particular, some uses of hidden watchpoints (since they are used in support of a user's watchpoint and in general not visible to them) can be replaced by use of breakpoints (which are generally less limited in number), together with additional support from the VM.

FIGS. 11A, 11B, and 11C show matrices summarizing the properties, similarities, and differences between the processes described above in reference to FIGS. 3-10. In FIGS. 11A, 11B, and 11C, the column heading "Relocation Table" refers to the processes discussed above in reference to FIGS. 3 and 4; the column heading "Eager" refers to the processes discussed above in reference to FIGS. 5 and 6; the column heading "Eager (optimized)" refers to the processes discussed above in reference to FIGS. 7 and 8; and the column heading "Selective" refers to the processes discussed above in reference to FIGS. 9 and 10.

As shown in FIG. 11A, the matrix outlines the VM support, the number/position of VM halts, and the trigger mechanism for each of the processes described above in reference to FIGS. 3-10. As shown in FIG. 11B, the matrix outlines the debugger support and the total number of watchpoints (i.e., object watchpoints and hidden memory watchpoints) for each of the processes described above in reference to FIGS. 3-10. As shown in FIG. 11C, the matrix outlines the implementation complexity, VM memory occupied, and accuracy for each of the processes described above in reference to FIGS. 3-10.

Figure 12:
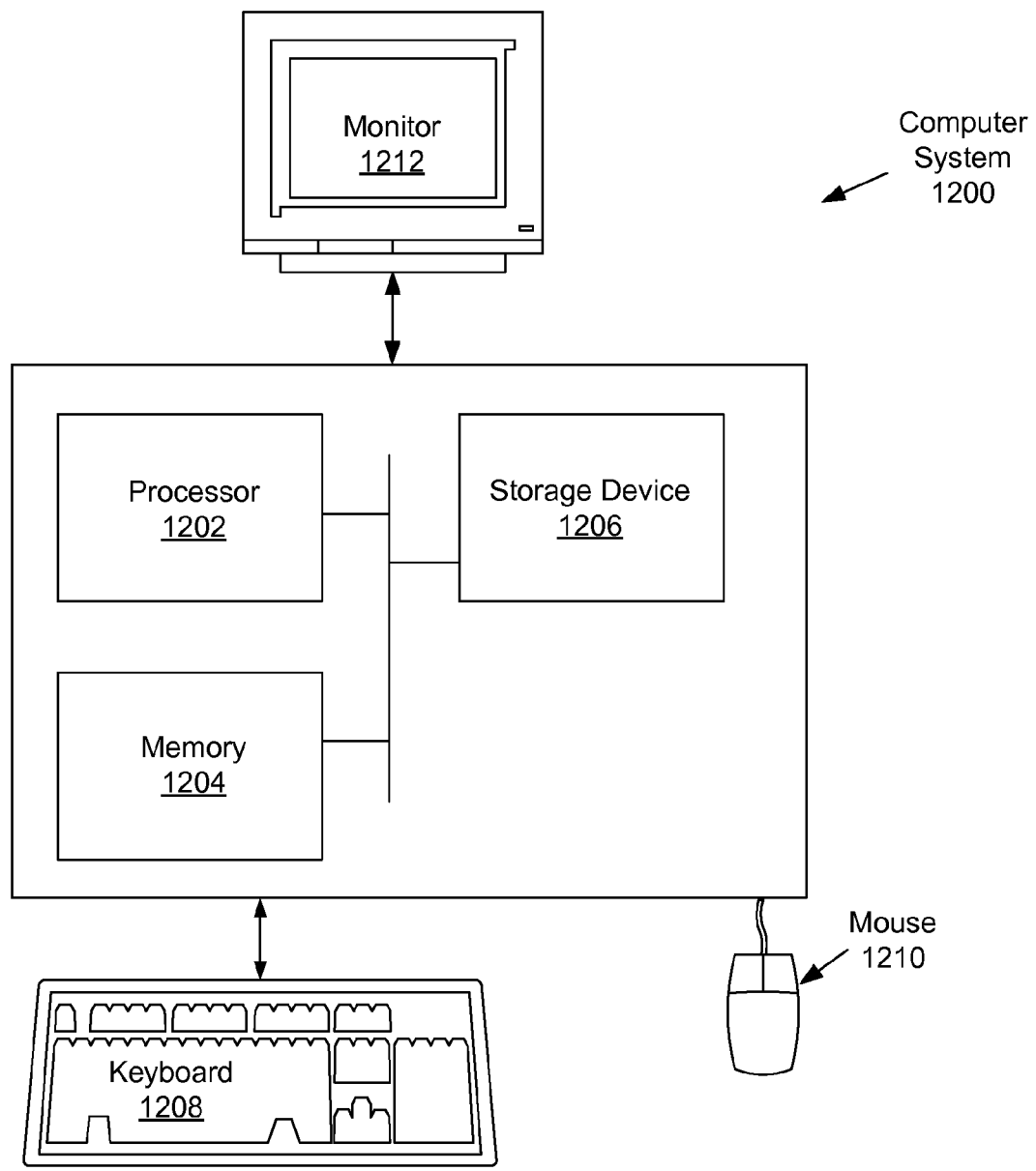
FIG. 12 shows a computer system in accordance with one or more embodiments of the invention.

The invention may be implemented on virtually any type of computer regardless of the platform being used. For example, as shown in FIG. 12, a computer system (1200) includes a processor (1202), associated memory (1204), a storage device (1206), and numerous other elements and functionalities typical of today's computers (not shown). Computer system (1200) may also include input means, such as a keyboard (1208) and a mouse (1210), and output means, such as a monitor (1212). Computer system (1200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (1200) may be located at a remote location and connected to the other elements over a network. Further, the invention may be implemented on a distributed system having a plurality of nodes, where each portion of the invention (e.g. virtual machine memory, garbage collector, debugger, and the like) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible non-volatile computer readable storage medium such as a compact disc (CD), a diskette, a tape, a punch card, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an object watchpoint during a garbage collection cycle, comprising:
identifying an object having a field, wherein the object is associated with an original object location, wherein the field is associated with an original field location, and wherein the object and the field are located in a memory heap of a virtual machine memory;

setting, within a debugger, the object watchpoint on the original field location, wherein the object watchpoint is a memory trap associated with the object;

identifying a card table comprising a card mapping to a plurality of locations including the original object location;

setting a hidden watchpoint on a card table entry corresponding to the card, wherein the hidden watchpoint is a memory trap associated with the card table entry;

catching a hidden watchpoint event triggered by a garbage collector (GC) accessing the card table entry during a relocation of the object by the GC;

pausing the garbage collection cycle in response to catching the hidden watchpoint;

accessing a value from a move_from field after catching the hidden watchpoint;

comparing the value with the original object location to generate a match;

determining a new object location associated with the object by accessing, based on the match, a move_to field referencing the new object location;

determining a new field location of the field based on the new object location;

setting, within the debugger, the object watchpoint on the new field location; and resuming the garbage collection cycle after setting the object watchpoint on the new field location, wherein the GC accesses the card table entry during the relocation.

2. The method of claim 1, further comprising:

identifying a counter tracking a number of objects within the card having watchpoints; and decrementing the counter in response to the new object location being outside the plurality of locations corresponding to the card.

3. The method of claim 2, further comprising:

removing the hidden watchpoint from the card table entry in response to the counter equaling zero.

4. A system for managing an object watchpoint during a garbage collection cycle, comprising:

a computer processor, memory heap of a virtual machine memory comprising an object having a field, wherein the object is associated with an original object location, and wherein the field is associated with an original field location;

a garbage collector (GC) executing on the computer processor and configured to execute a relocation of the object in the memory heap;

a card table having a card mapping to a plurality of locations including the original object location; and a debugger configured to:

set the object watchpoint on the original field location, wherein the object watchpoint is a memory trap associated with the object;

set a hidden watchpoint on a card table entry corresponding to the card, wherein the hidden watchpoint is a memory trap associated with the card table entry;

catch a hidden watchpoint event triggered by the GC accessing the card table entry during the relocation;

pause the garbage collection cycle in response to catching the hidden watchpoint;

access a value from a move from field after catching the hidden watchpoint;

compare the value with the original object location to generate a match;

determine a new object location associated with the object after the relocation by accessing, based on the match, a move to field referencing the new object location;

determine a new field location of the field based on the new object location;

set the object watchpoint on the new field location; and resume the garbage collection cycle after the object watchpoint is set on the new field location, wherein the GC accesses the card table entry during the relocation.

5. A non-transitory computer readable medium storing instruction to manage an object watchpoint during a garbage collection cycle, the instructions executable on a processor and comprising functionality to:

identify an object having a field, wherein the object is associated with an original object location, wherein the field is associated with an original field location, and wherein the object and the field are located in a memory heap of a virtual machine memory;

set, within a debugger, the object watchpoint on the original field location, wherein the object watchpoint is a memory trap associated with the object;

identify a card table comprising a card mapping to a plurality of locations including the original object location;

set a hidden watchpoint on a card table entry corresponding to the card, wherein the hidden watchpoint is a memory trap associated with the card table entry;

catch a hidden watchpoint event triggered by a garbage collector (GC) accessing the card table entry during a relocation of the object by the GC;

pause the garbage collection cycle in response to catching the hidden watchpoint;

access a value from a move from field after catching the hidden watchpoint;

compare the value with the original object location to generate a match;

determine a new object location associated with the object by accessing, based on the match, a move to field referencing the new object location;

determine a new field location of the field based on the new object location;

set, within the debugger, the object watchpoint on the new field location; and resume the garbage collection cycle after the object watchpoint is set on the new field location, wherein the GC accesses the card table entry during the relocation.

6. The non-transitory computer readable medium of claim 5, the instructions further comprising functionality to:

identify a counter tracking a number of objects within the card having watchpoints; and decrement the counter in response to the new object location being outside the plurality of locations.

7. The system of claim 4, wherein the debugger is further configured to:

identify a counter tracking a number of objects within the card having watchpoints; and decrement the counter in response to the new object location being outside the plurality of locations corresponding to the card.

8. The system of claim 7, wherein the debugger is further configured to:

remove the hidden watchpoint from the card table entry in response to the counter equaling zero.

* * * * *

UNITED STATES PATENT AND TRADEMARK OFFICE
CERTIFICATE OF CORRECTION

| | | |
|---|---|---|
| PATENT NO. | : 8,489,652 B2 | Page 1 of 1 |
| APPLICATION NO. | : 12/792685 | |
| DATED | : July 16, 2013 | |
| INVENTOR(S) | : Van De Vanter et al. | |

It is certified that error appears in the above-identified patent and that said Letters Patent is hereby corrected as shown below:

In the Drawings

On sheet 11 of 14, in figure 11A, line 16, delete "more" and insert -- or --, therefor.

On sheet 12 of 14, in figure 11B, line 9, delete "fowarding" and insert -- forwarding --, therefor.

In the Specification

In column 1, line 9, delete "machine" and insert -- machine. --, therefor.

In column 1, line 10, delete "machine" and insert -- machine. --, therefor.

In the Claims

In column 15, line 62, in Claim 4, delete "move from" and insert -- move_from --, therefor.

In column 16, line 3, in Claim 4, delete "move to" and insert -- move_to --, therefor.

In column 16, line 33, in Claim 5, delete "move from" and insert -- move_from --, therefor.

In column 16, line 38, in Claim 5, delete "move to" and insert -- move_to --, therefor.

Signed and Sealed this
Twenty-second Day of October, 2013

Teresa Stanek Rea
*Deputy Director of the United States Patent and Trademark Office*